US012539239B2

(12) United States Patent
Stewart, III

(10) Patent No.: US 12,539,239 B2
(45) Date of Patent: *Feb. 3, 2026

(54) RIGID MOBILITY DEVICE

(71) Applicant: Kenneth G. Stewart, III, Bradenton, FL (US)

(72) Inventor: Kenneth G. Stewart, III, Bradenton, FL (US)

(*) Notice: Subject to any disclaimer, the term of this patent is extended or adjusted under 35 U.S.C. 154(b) by 24 days.

This patent is subject to a terminal disclaimer.

(21) Appl. No.: 18/668,604

(22) Filed: May 20, 2024

(65) Prior Publication Data

US 2024/0307238 A1 Sep. 19, 2024

Related U.S. Application Data

(63) Continuation of application No. 17/835,490, filed on Jun. 8, 2022, now Pat. No. 12,036,152.

(51) Int. Cl.

*A61G 1/003* (2006.01)
*A61G 1/013* (2006.01)
*A61G 1/04* (2006.01)

(52) U.S. Cl.

CPC ............ *A61G 1/003* (2013.01); *A61G 1/013* (2013.01); *A61G 1/04* (2013.01); *A61G 2200/36* (2013.01); *A61G 2200/60* (2013.01)

(58) Field of Classification Search

None

See application file for complete search history.

(56) References Cited

U.S. PATENT DOCUMENTS

| | | | | |
|---|---|---|---|---|
| 954,840 | A * | 4/1910 | Chadwick | A45F 5/1046 190/102 |
| 1,096,489 | A * | 5/1914 | Wiedmann | A45F 3/14 5/625 |
| 1,849,864 | A * | 3/1932 | Caspar | A61G 1/01 224/159 |
| 1,923,617 | A * | 8/1933 | Edensword | A61G 7/1003 5/81.1 R |
| 4,443,902 | A | 4/1984 | Baer | |
| 6,250,713 | B1 | 6/2001 | Grohs et al. | |
| 8,336,141 | B2 * | 12/2012 | Wong | A61G 1/01 224/259 |
| 9,925,097 | B2 | 3/2018 | Yancovitch et al. | |
| 11,229,569 | B2 | 1/2022 | Edouart-Sorensen | |

FOREIGN PATENT DOCUMENTS

| | | | | |
|---|---|---|---|---|
| AT | 164270 | B | 10/1949 | |
| JP | 2014033956 | A | 2/2014 | |
| WO | WO-2007141793 | A2 * | 12/2007 | A61G 1/013 |
| WO | 2021234827 | A1 | 11/2021 | |

* cited by examiner

*Primary Examiner* — Adam C Ortiz

(74) *Attorney, Agent, or Firm* — Barnes & Thornburg LLP; Steven D. Shipe

(57) ABSTRACT

A rigid mobility device for supporting a person having an injury as a patient in an upright position relative to the ground includes a first caregiver support platform, a second caregiver support platform, and a patient support platform. The first caregiver support platform and the second caregiver support platform each rest on the shoulders of first and second caregivers. The patient support platform supports the arms of the patient.

4 Claims, 3 Drawing Sheets

RIGID MOBILITY DEVICE

CROSS-REFERENCE TO RELATED APPLICATIONS

This patent application is a Continuation Application of U.S. patent application Ser. No. 17/835,490, filed Jun. 8, 2022, titled "RIGID MOBILITY DEVICE," the disclosure of which is incorporated herein by reference in its entirety.

TECHNICAL FIELD

The present disclosure relates to devices, systems, and methods concerning the field of mobility devices. More particularly, the present disclosure relates to devices, systems, and methods concerning the field of rigid mobility devices.

BACKGROUND

Carrying devices, or mobility devices, such as stretchers or mobility assistance devices, can be used by caregivers to provide mobility assistance (e.g., carrying or support) to persons suffering from ailments concerning weight-bearing and/or mobility, which may include pain or injury. Traditional carrying devices may be used to carry such persons while lying down or sitting upright. Alternatively, one or more caregivers may assist a person, such as an athlete, as a patient, in an upright position, for example, by draping the patient's arms over the shoulders of the caregiver(s), without the use of a carrying device. Issues, such as stability issues, can ensue. Additionally, at times, if the caregiver(s) are a different height than the patient, the patient may be more likely to bear weight on the place of the ailment, such as their leg, ankle, or knee. Such incidents can worsen the ailment, prolong recovery time, and/or risk further disturbance to player or caregiver, for example, should a fall occur due to poor support.

SUMMARY

These and other features of the present disclosure will become more apparent from the following description of the illustrative embodiments.

According to an illustrative aspect of the present disclosure, a rigid mobility device for supporting a person having an injury as a patient in an upright position relative to the ground includes a first caregiver support platform, a second caregiver support platform, and a patient support platform. The first caregiver support platform and the second caregiver support platform are configured to rest on the shoulders of first and second caregivers, respectively. The second caregiver support platform is longitudinally spaced apart from the first caregiver support platform. The patient support platform is configured to support the arms of the patient. The patient support platform is also positioned between the first caregiver support platform and the second caregiver support platform.

Each caregiver support platform includes an outward shoulder support, an inward shoulder support, and at least one connector. The inward shoulder support is longitudinally spaced apart from the outward shoulder support. The at least one connector is arranged to extend between the outward shoulder support and the inward shoulder support. A shoulder engagement surface of each outward shoulder support is vertically aligned with a shoulder engagement surface of the inward shoulder support of the corresponding caregiver support platform. The outward shoulder support, the inward shoulder support, and the at least one connector of each caregiver support platform cooperate to define a caregiver receiving space.

The patient support platform includes a first arm support, a second arm support, and at least one connector. The second arm support is longitudinally spaced apart from the first arm support. The at least one connector is arranged to extend between the first arm support and the second arm support. A forearm support surface of the first arm support is vertically aligned with a forearm support surface of the second arm support. The first arm support, the second arm support, and the at least one connector cooperate to define a patient receiving space.

Each caregiver support platform receives a caregiver within the caregiver receiving space such that the inward and outward shoulder supports of each caregiver shoulder support platform engage the caregiver's shoulders to support the patient. The caregiver's neck also extends through the caregiver receiving space.

In some embodiments, the patient support platform receives a patient within the patient receiving space such that the first arm support and the second arm support of the patient support platform each engage the patient's forearms to support the patient. The patient's torso also extends through the patient receiving space. In some embodiments, each forearm support surface of the patient support platform is vertically offset relative to each shoulder engagement surface of the first and second caregiver support platforms such that the patient's arms are supported at a height offset from each caregiver's shoulders. In some embodiments, the shoulder engagement surfaces of each of the first and second caregiver support platforms are vertically aligned with each other. In some embodiments, the patient's arms are supported higher than each caregiver's shoulders. In some embodiments, the patient's arms are supported lower than each caregiver's shoulders. In some embodiments, the rigid mobility device is vertically reversible such that the vertical offset between the forearm support surfaces and each shoulder engagement surface can be selectively arranged to locate the forearm support surfaces above or below the shoulder engagement surfaces. In some embodiments, each of the shoulder engagement surfaces and forearm engagement surfaces include reversible surfaces having opposing upper and lower portions.

In some embodiments, each forearm support surface is a first distance from the ground and each shoulder engagement surface is a second distance from the ground. The first distance is different than the second distance. In some embodiments, the outward shoulder support, the inward shoulder support, and the at least one connector of each caregiver support platform cooperate to define a U-shaped caregiver receiving space. In some embodiments, the first arm support, the second arm support, and the at least one connector of the patient support platform cooperate to define a U-shaped patient receiving space. In some embodiments, the rigid mobility device includes a first end and a second end longitudinally spaced apart from the first end. The at least one connector of each caregiver support platform and the at least one connector of the patient support platform form a unitary longitudinal segment extending between the first and second ends. In some embodiments, the at least one connector of the patient support platform includes a first connector coupled to the first caregiver support platform and a second connector coupled to the second caregiver support platform. The second connector is also engaged with the first connector to form a hinged connection so that the device can be folded between an extended position for use and a collapsed position for storage/portage. In some embodiments, the forearm engagement surfaces of the patient support platform are further configured for engagement with the patient's forearms to provide a support to lift their legs partly or wholly off the ground.

In some embodiments, the rigid mobility device includes a rear edge. The at least one connector of each caregiver support platform and the at least one connector of the patient support platform are located proximate to the rear edge. In some embodiments, the at least one connector of each caregiver support platform includes a rear edge, while the at least one connector of the patient support platform includes a rear edge. The rear edge of the at least one connector of each caregiver support platform and the rear edge of the at least one connector of the patient support platform cooperate to define the rear edge of the rigid mobility device.

In some embodiments, the rigid mobility device further includes a first curved transition defined between the first caregiver support platform and the patient support platform. In some embodiments, the first curved transition is located between the shoulder engagement surface of the inward shoulder support of the first caregiver support platform and the forearm support surface of the first arm support of the patient support platform. In some embodiments, the rigid mobility device further includes a second curved transition located between the second caregiver support platform and the patient support platform. In some embodiments, the first curved transition is located between the shoulder engagement surface of the inward shoulder support of the first caregiver support platform and the forearm support surface of the first arm support of the patient support platform, while the second curved transition is defined between the shoulder engagement surface of the inward shoulder support of the second caregiver support platform and the forearm support surface of the second arm support of the patient support platform.

BRIEF DESCRIPTION OF THE DRAWINGS

The concepts described in the present disclosure are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. The detailed description particularly refers to the accompanying figures in which.

DETAILED DESCRIPTION OF THE DRAWINGS

Figure 1:
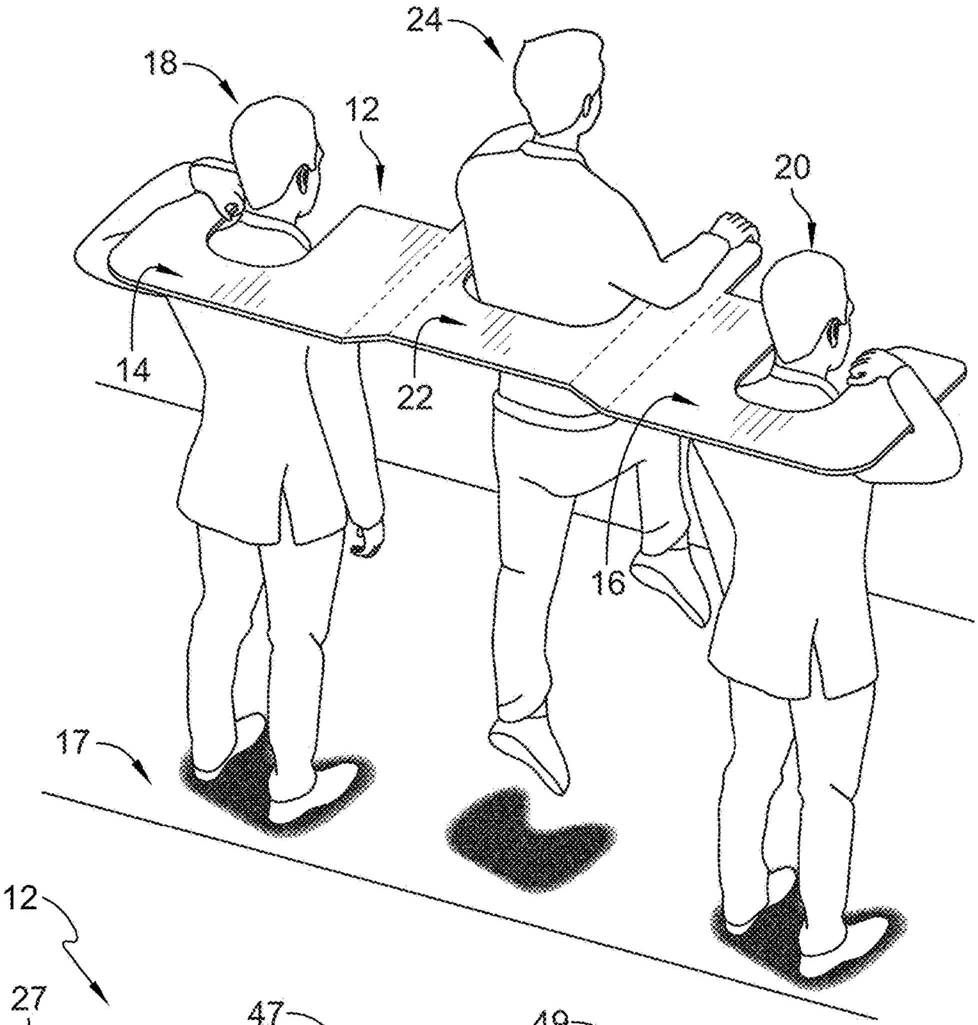
FIG. 1 is a perspective view of a mobility device in accordance with aspects of the present disclosure, the mobility device shown supported by a first caregiver and a second caregiver and providing support to a person as a patient in an upright position.

While the concepts of the present disclosure are susceptible to various modifications and alternative forms, specific embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

Mobility devices, such as stretchers, carrying devices or mobility assistance devices, can be used by caregivers to provide mobility assistance (e.g., carrying or support) to persons suffering from mobility ailments. Such ailments may be manifest as pain or injury, but may also be less perceptible. For example, athletic teams may have athletes requiring mobility assistance from the field of play, whether during competition or practice. Traditional mobility devices may be used to carry or assist such persons while lying down or sitting upright. Alternatively, one or more caregivers may assist a person, such as an athlete, as a patient, in an upright position, for example, by draping the patient's arms over the shoulders of the caregiver(s), without the use of a mobility device. At times, if the caregiver(s) have different height than the patient (or different shoulder height), the patient may be more likely to bear weight on the place of the injury, such as their leg, ankle, or knee. For example, if a football player injures their ankle during a game or practice and needs assistance to exit the field, and two caregivers who are shorter than the football player, attempt to carry or provide support to assist the player to exit the field, the player may bear too much weight on their injured ankle. Such incidents can worsen the injury, prolong recovery time, and/or risk further injury to player or caregiver, for example, should a fall occur due to poor support. A rigid mobility device may distribute the force of patient weight to provide better support to the patient, better force transfer to caregiver(s), and/or better positioning for assisting patient mobility.

FIG. 1 illustrates an exemplary mobility device 12. The mobility device 12 is illustratively rigid to provide mobility support to a person as a patient, in an upright position. The rigid mobility device 12 illustratively includes a first caregiver support platform 14 and a second caregiver support platform 16 for resting on the shoulders of first and second caregivers 18, 20. The second caregiver support platform 16 is longitudinally spaced apart from the first caregiver support platform 14. The rigid mobility device 12 also illustratively includes a patient support platform 22 for supporting a patient 24. The patient support platform 22 is positioned between the first caregiver support platform 14 and the second caregiver support platform 16.

Figure 2:
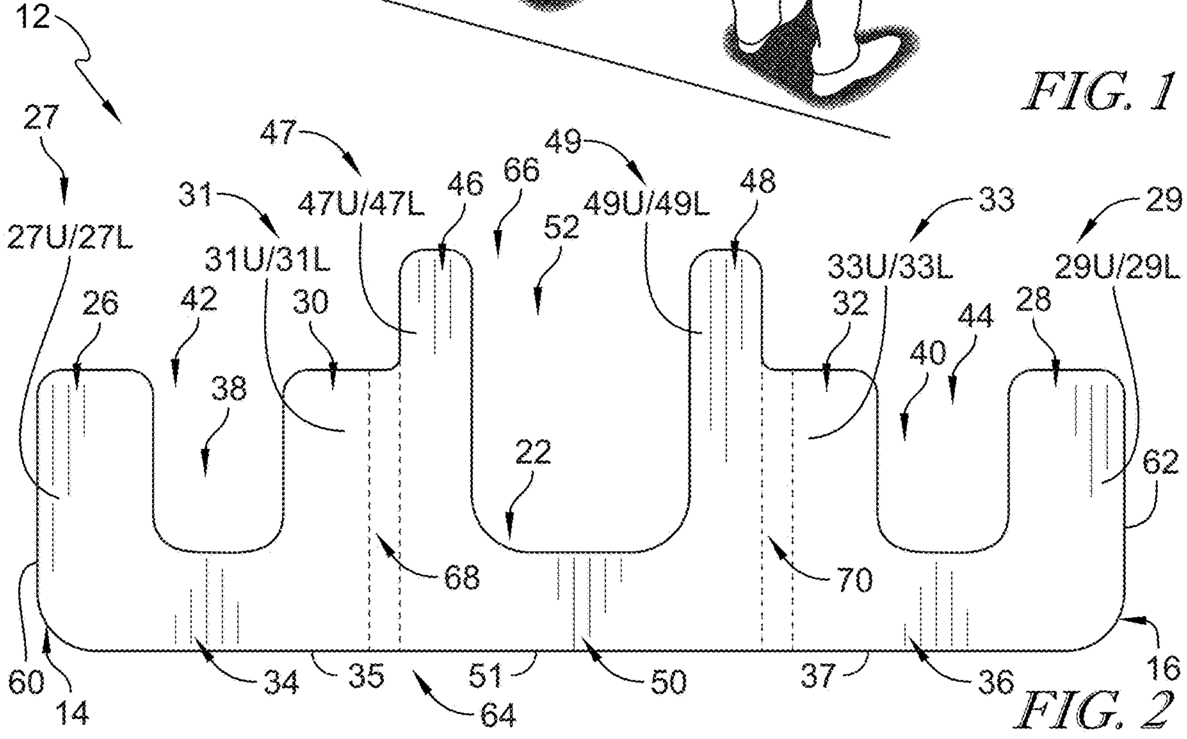
FIG. 2 is a top plan view of the mobility device of the present embodiment showing the mobility device to include a first caregiver support platform and a second caregiver support platform longitudinally spaced apart from each other, and a patient support platform positioned between the first caregiver support platform and the second caregiver support platform.

Referring now to FIG. 2, the first caregiver support platform 14 illustratively includes an outward shoulder support 26, an inward shoulder support 30 longitudinally spaced apart from the outward shoulder support 26, and at least one connector 34 which extends longitudinally between the outward shoulder support 26 and the inward shoulder support 30. The outward shoulder support 26, the inward shoulder support 30, and the at least one connector 34 cooperate to define a caregiver receiving space 38 of the first caregiver support platform 14. In the illustrative embodiment, the first caregiver support platform 14 has one connector 34.

Similarly, as shown in FIG. 2, the second caregiver support platform 16 illustratively includes an outward shoulder support 28, an inward shoulder support 32 longitudinally spaced apart from the outward shoulder support 28, and at least one connector 36 which extends longitudinally between the outward shoulder support 28 and the inward shoulder support 32. The outward shoulder support 28, the inward shoulder support 32, and the at least one connector 36 cooperate to define a caregiver receiving space 40 of the second caregiver support platform 16. In the illustrative embodiment, the second caregiver support platform 16 has one connector 36.

Still referring to FIG. 2, in the illustrative embodiment, the caregiver receiving space 38 is U-shaped. The caregiver receiving space 38 includes an opening 42 at one exterior side and is bounded by the outward shoulder support 26, the inward shoulder support 30, and the at least one connector 34 on other exterior sides. The U-shape or laterally open-shape can permit the first caregiver 18 to enter the caregiver receiving space 38 from the lateral direction. The U-shape is also open transversely to the lateral-longitudinal plane (e.g., vertically) to permit the neck of the first caregiver 18 to extend (vertically) through the caregiver receiving space 38. In the illustrative embodiment, the caregiver receiving space 38 is longitudinally sized to accommodate the head and/or the neck of the first caregiver 18 therethrough, with minimal additional gap. In other words, longitudinal movement of the first caregiver's neck 18 may be limited in the caregiver receiving space 38 to afford additional control. In the illustrative embodiment, the caregiver receiving space 38 is longitudinally shorter than the patient receiving space, however, in some embodiments, the longitudinal size of the caregiver receiving space 38 may be any suitable size.

Likewise, as shown in FIG. 2, in the illustrative embodiment, the caregiver receiving spaces 40 is also U-shaped. The caregiver receiving space 40 includes an opening 44 at one exterior side and is bounded by the outward shoulder support 28, the inward shoulder support 32, and the at least one connector 36 on other exterior sides. The U-shape or laterally open-shape can permit the second caregiver 20 to enter the caregiver receiving space 40 from the lateral direction. The U-shape is also open transversely to the lateral-longitudinal plane (e.g., vertically) to permit the neck of the second caregiver 20 to extend (vertically) through the caregiver receiving space 40. In the illustrative embodiment, the caregiver receiving space 40 is longitudinally sized to accommodate the head and/or the neck of the second caregiver 20 therethrough, with minimal additional gap. In other words, longitudinal movement of the second caregiver's neck 20 may be limited in the caregiver receiving space 40 to afford additional control. In the illustrative embodiment, the caregiver receiving space 40 is longitudinally shorter than the patient receiving space 52, however, in some embodiments, the longitudinal size of the caregiver receiving space 40 may be any suitable size.

Figure 3:
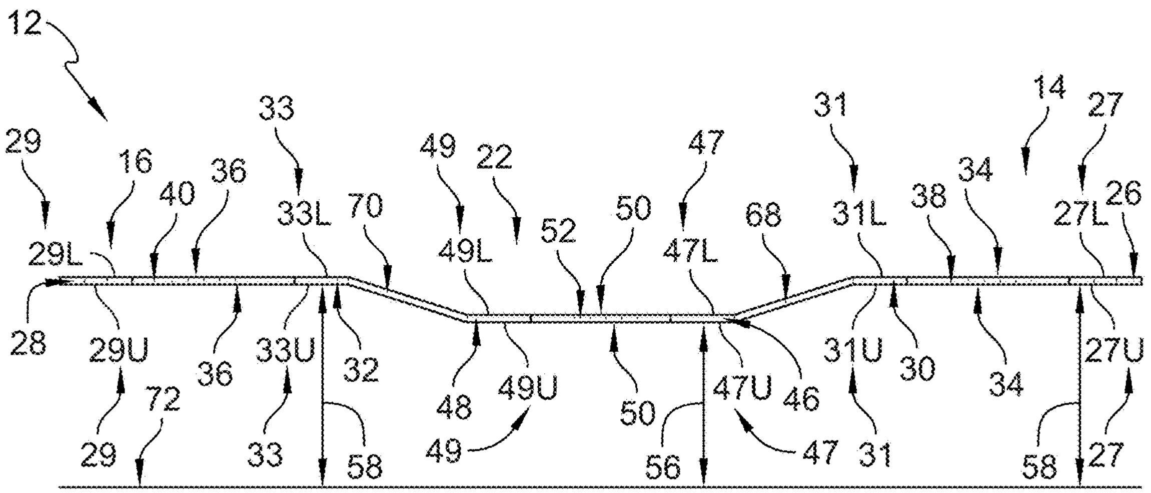
FIG. 3 is a front elevation view of the mobility device of FIGS. 1 and 2, showing that the patient support platform includes support surfaces, and showing that the support surfaces can be arranged vertically offset (below) engagement surfaces of the first and second caregiver support platforms.
Figure 4:
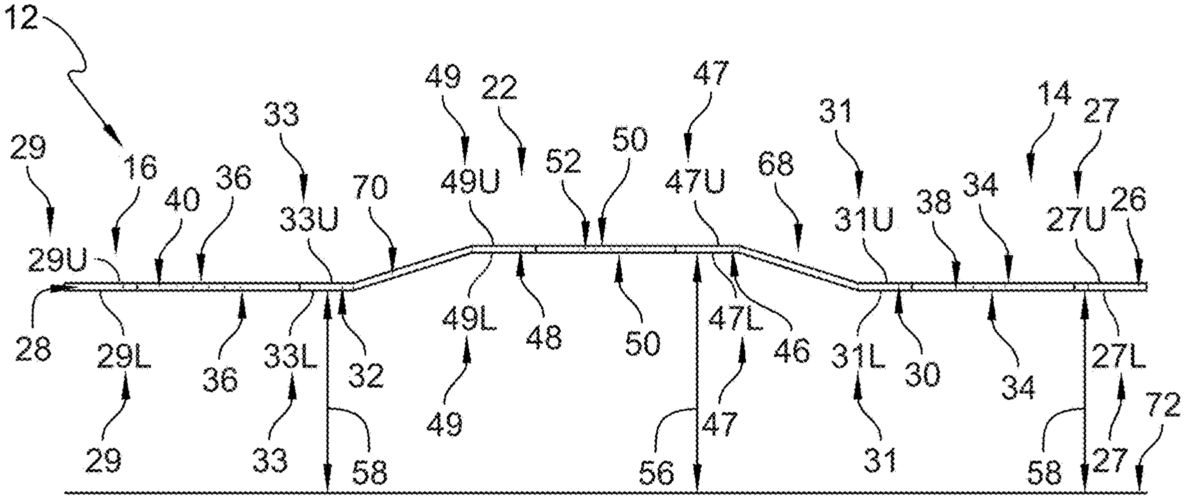
FIG. 4 is a front elevation view of the mobility device of FIGS. 1-3, in an inverter position relative to FIG. 3, showing the support surfaces of the patient support platform vertically offset (above) the engagement surfaces of the first and second caregiver support platform, illustrating that the mobility device is vertically reversible for varying positions of the surfaces of the patient support platform and the caregiver support platform.

Referring now to FIGS. 3 and 4, for the first caregiver support platform 14, the outward shoulder support 26 has a shoulder engagement surface 27 and the inward shoulder support 30 has a shoulder engagement surface 31. The shoulder engagement surface 27 of the outward shoulder support 26 is vertically aligned with the shoulder engagement surface 31 of the inward shoulder support 30. When the first caregiver 18 enters the caregiver receiving space 38, the shoulder engagement surfaces 27, 31 engage the shoulders of the first caregiver 18 while the neck of the first caregiver 18 extends vertically through the caregiver receiving space 38, as shown in FIG. 1. In some embodiments, the shoulder engagement surfaces 27, 31 may be formed from a layer of padded or deformable material (not shown) coupled to the outward and inward shoulder supports 26, 30.

Similarly, as shown in FIGS. 3 and 4, for the second caregiver support platform 16, the outward shoulder support 28 has a shoulder engagement surface 29 and the inward shoulder support 32 has a shoulder engagement surface 33. The shoulder engagement surface 29 of the outward shoulder support 28 is vertically aligned with the shoulder engagement surface 33 of the inward shoulder support 32. When the second caregiver 20 enters the caregiver receiving space 40, the shoulder engagement surfaces 29, 33 engage the shoulders of the second caregiver 20 while the neck of the second caregiver 20 extends vertically through the caregiver receiving space 40, as shown in FIG. 1. In some embodiments, the shoulder engagement surfaces 29, 33 may be defined by a layer of padded or deformable material (not shown) coupled to the body forming the outward and inward shoulder supports 28, 32.

In the illustrative embodiment of FIGS. 3 and 4, the shoulder engagement surfaces 27, 31 of the first caregiver support platform 14 are also vertically aligned with the shoulder engagement surfaces 29, 33 of the second caregiver platform 16. In other embodiments, the shoulder engagement surfaces 27, 31 of the first caregiver support platform 14 may not be vertically aligned with the shoulder engagement surfaces 29, 33 of the second caregiver platform 16 to accommodate for caregivers 18, 20 having different heights.

Referring back to FIG. 2, the patient support platform 22 illustratively includes a first arm support 46, a second arm support 48 longitudinally spaced apart from the first arm support 46, and at least one connector 50 which extends longitudinally between the first arm support 46 and the second arm support 48. The first arm support 46, the second arm support 48, and the at least one connector 50 cooperate to define a patient receiving space 52 of the patient support platform 22. In the illustrative embodiment of FIG. 2, the patient support platform 22 has one connector 50.

Still referring to FIG. 2, the outward shoulder support 26, the inward shoulder support 30, and the at least one connector 34 of the first caregiver support platform 14 are integrally coupled together. In some embodiments, the outward shoulder support 26, the inward shoulder support 30, and the at least one connector 34 of the first caregiver support platform 14 are formed as an integrally formed piece of material. Similarly, the outward shoulder support 28, the inward shoulder support 32, and the at least one connector 36 of the second caregiver support platform 16 are integrally coupled together. In some embodiments, the outward shoulder support 28, the inward shoulder support 32, and the at least one connector 36 of the second caregiver support platform 16 are formed as an integrally formed piece of material. The first arm support 46, the second arm support 48, and the at least one connector 50 of the patient support platform 22 are also integrally coupled together. In some embodiments, the first arm support 46, the second arm support 48, and the at least one connector 50 of the patient support platform 22 are formed as an integrally formed piece of material. In some embodiments, the components of the first caregiver support platform 14, the second caregiver support platform 16, and the patient support platform 22 are integrally coupled together and/or are formed as an integrally formed piece of material.

The material for each component of the mobility device 12 may be any plastic, rubber, metal, wood, or any combination of materials suitable for supporting a patient 24 with a rigid mobility device 12. Each component of the mobility device 12 may be made of the same material, or the components of the mobility device 12 may be made of different materials. For example, the at least one connector 34 of the first caregiver support platform 14, the at least one connector 50 of the patient support platform 22, and the at least one connector 36 of the second caregiver support platform 16 may be made from a first material. Meanwhile, the outward shoulder supports 26, 28, the inward shoulder supports 30, 32 of the first and second caregiver support platforms 14 and the first arm support 46 and the second arm support 48 of the patient support platform 22 may be made from a second, different material.

As shown in FIG. 2, the at least one connector 34 of the first caregiver support platform 14, the at least one connector 50 of the patient support platform 22, and the at least one connector 36 of the second caregiver support platform 16 are located proximate to a rear edge 64 of the rigid mobility device 12. In the illustrative embodiment of FIG. 2, the at least one connector 34 of the first caregiver support platform 14 has a rear edge 35, the at least one connector 50 of the patient support platform 22 has a rear edge 51, and the at least one connector 36 of the second caregiver support platform 16 has a rear edge 37. In the illustrative embodiment, the rear edges 35, 51, and 37 cooperate to partially or wholly define the rear edge 64 of the rigid mobility device 12. In some embodiments, the rear edge 64 of the rigid mobility device 12 may be defined by fewer than all of the rear edges 35, 51, and 37.

Still referring to FIG. 2, in the illustrative embodiment, the patient receiving space 52 is U-shaped. The patient receiving space 52 includes an opening 66 at one exterior side and is bounded by the first arm support 46, the second arm support 48, and the at least one connector 50 on other exterior sides. The U-shape or laterally open shape can permit the patient 24 to enter the patient receiving space 52 from the lateral direction. The U-shape is also open transversely to the lateral-longitudinal plane (e.g., vertically) to permit the torso of the patient 24 to extend (vertically) through the patient receiving space 52.

Referring back to FIGS. 3 and 4, the first arm support 46 has a support surface 47, embodied as a forearm support surface, and the second arm support 48 has a support surface 49, embodied as a forearm support surface. The forearm support surface 47 of the first arm support 46 is vertically aligned with the forearm support surface 49 of the second arm support 48. When the patient 24 enters the patient receiving space 52, the forearm support surfaces 47, 49 engage the arms (forearms) of the patient 24 while at least a portion of the patient's torso extends vertically through the patient receiving space 52, as shown in FIG. 1. In some embodiments, the forearm support surfaces 47, 49 may be defined by a layer of padded or deformable material (not shown) coupled to the first and second arm supports 46, 48, for example, covering the rigid body of the supports 46, 48. The forearm support surfaces 47, 49 thus provide a support for the patient 24 to lift their legs partly or wholly off the ground 72, as suggested in FIG. 1.

In the illustrative embodiment of FIGS. 3 and 4, the forearm support surfaces 47, 49 of the patient support platform 22 are vertically aligned with each other. The forearm support surfaces 47, 49 are a first distance 56 from the ground while the shoulder engagement surfaces 27, 31 of the first caregiver support platform 14 and the shoulder engagement surfaces 29, 33 of the second caregiver support platform 16 are a second, different distance 58 from the ground. In FIG. 3, the first distance 56 is less than the second distance 58 so that the arms of the patient 24 are supported lower than the shoulders of each caregiver 18, 20. In FIG. 4, the first distance 56 is greater than the second distance 58 so that the arms of the patient 24 are supported higher than the shoulders of each caregiver 18, 20. Thus, as shown in FIG. 1, the arms of the patient 24 are supported at a height offset from the shoulders of each caregiver 18, 20. In some embodiments, the first distance is the same as the second distance. Such offset can allow the patient to be supported well off the ground to avoid any contact with the group, and/or can permit more accommodating support for a patient considerably taller than the caregivers. In other embodiments, the shoulder engagement surfaces 29, 33 of the second caregiver support platform 16 are a third distance (not shown) from the ground. The third distance may be greater than, less than, or the same as the first distance and/or the second distance.

Referring still to FIGS. 3 and 4, the mobility device 12 is vertically reversible. Therefore, the first distance 58 can be selectively greater than or less than the second distance 60 so that the forearm engagement surfaces 47, 49 can be selectively above or below the shoulder engagement surfaces 27, 29, 31, 33. The shoulder engagement surfaces 27, 29, 31, 33 have reversible surfaces having opposing upper portions 27U, 29U, 31U, 33U and lower portions 27L, 29L, 31L, 33L, which permits the mobility device 12 to be vertically reversible. Likewise, the forearm engagement surfaces 47, 49 have reversible surfaces having opposing upper portions 47U, 49U and lower portions 47L, 49L.

Figure 5:
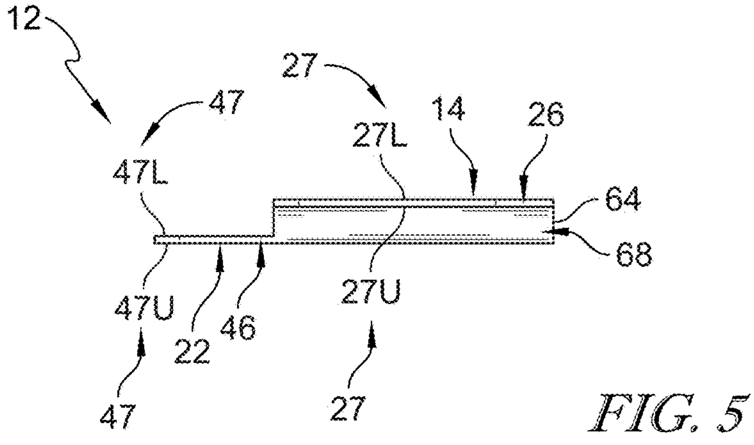
FIG. 5 is a side elevation view of the mobility device of FIGS. 1-4, showing a first curved transition defined between the first caregiver support platform and the patient support platform.

Referring now to FIGS. 3-5, the mobility device 12 includes a first curved transition 68 and a second curved transition 70. The first curved transition 68 is defined between the inward shoulder support 30 of the first caregiver support platform 14 and the first arm support 46 of the patient support platform 22. The second curved transition 70 is defined between the inward shoulder support 32 of the second caregiver support platform 22 and the second arm support 48 of the patient support platform 22. As shown in FIGS. 3-5, the first curved transition 68 is defined between the shoulder engagement surface 31 and the forearm support surface 47, while the second curved transition 70 is defined between the shoulder engagement surface 33 and the forearm support surface 49. The first and second caregiver support platforms 14, 16, the patient support platform 22, and the first and second curved transitions 68, 70 may be integrally coupled together, may be formed as an integrally formed piece of material, and/or may be formed from different materials. In some embodiments, the mobility device 12 may include only one of the first and second curved transitions 68, 70. In other embodiments, the mobility device 12 may not include the first and second curved transitions 68, 70. For example, the inward shoulder support 30 may be integrally coupled to the first arm support 46 and the inward shoulder support 32 may be integrally coupled to the second arm support 48.

Referring back to FIG. 2, the first end 60 of the rigid mobility device 12 is longitudinally spaced apart from the second end 62 of the rigid mobility device 12. In the illustrative embodiment, the at least one connector 34 of the first caregiver support platform 14, the first curved transition 68, the at least one connector 50 of the patient support platform 22, the second curved transition 70, and the at least one connector 36 of the second caregiver support platform 16 form a unitary longitudinal segment extending between the first end 60 and the second end 62. Thus, the at least one connector 34 of the first caregiver support platform 14, the first curved transition 68, the at least one connector 50 of the patient support platform 22, the second curved transition 70, and the at least one connector 36 of the second caregiver support platform 16 are integrally coupled together. In some embodiments, the at least one connector 34 of the first caregiver support platform 14, the first curved transition 68, the at least one connector 50 of the patient support platform 22, the second curved transition 70, and the at least one connector 36 of the second caregiver support platform 16 may be formed as an integrally formed piece of material.

In some embodiments, the rigid mobility device 12 may not include first curved transition 68 and second curved transition 70. For example, the at least one connector 34, the at least one connector 50, and the at least one connector 36 may form a unitary longitudinal segment extending between the first end 60 and the second end 62. Thus, the at least one connector 34, the at least one connector 50, and the at least one connector 36 of the second caregiver support platform 16 may be integrally coupled together and/or may be formed as an integrally formed piece of material. Likewise, the at least one connector 34 and the first connector 50A may form a unitary longitudinal segment extending between the first end 60 and an outer end 53A of the first connector 50A, may be integrally coupled together and/or may be formed as an integrally formed piece of material. The second connector 50B and the at least one connector 36 may also form a unitary longitudinal segment extending an outer end 53B of the second connector 50B and the second end 62, may be integrally coupled together and/or may be formed as an integrally formed piece of material.

Figure 6A:
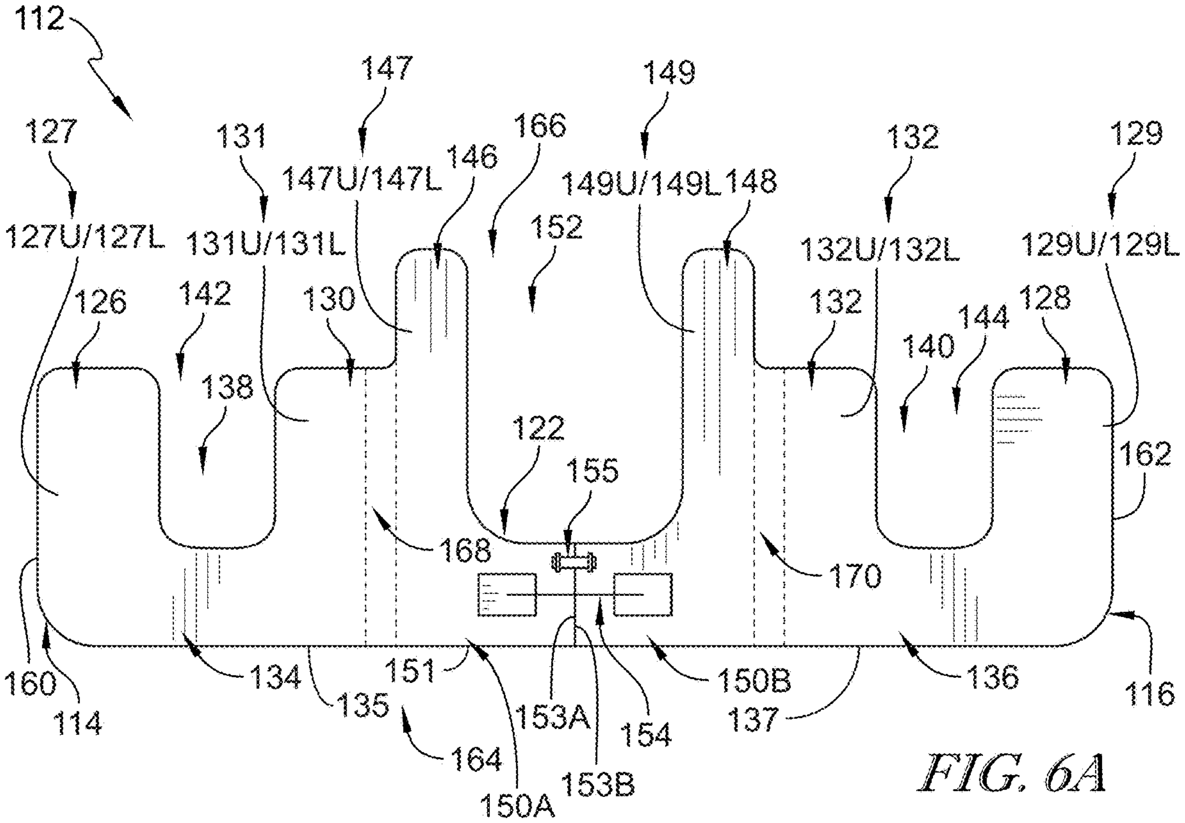
FIG. 6A is a top plan view of another embodiment of a mobility device in accordance with aspects of the present disclosure, similar to FIG. 1, arranged in an extended positon for use, showing that the patient support platform includes a hinged connection.
Figure 6B:
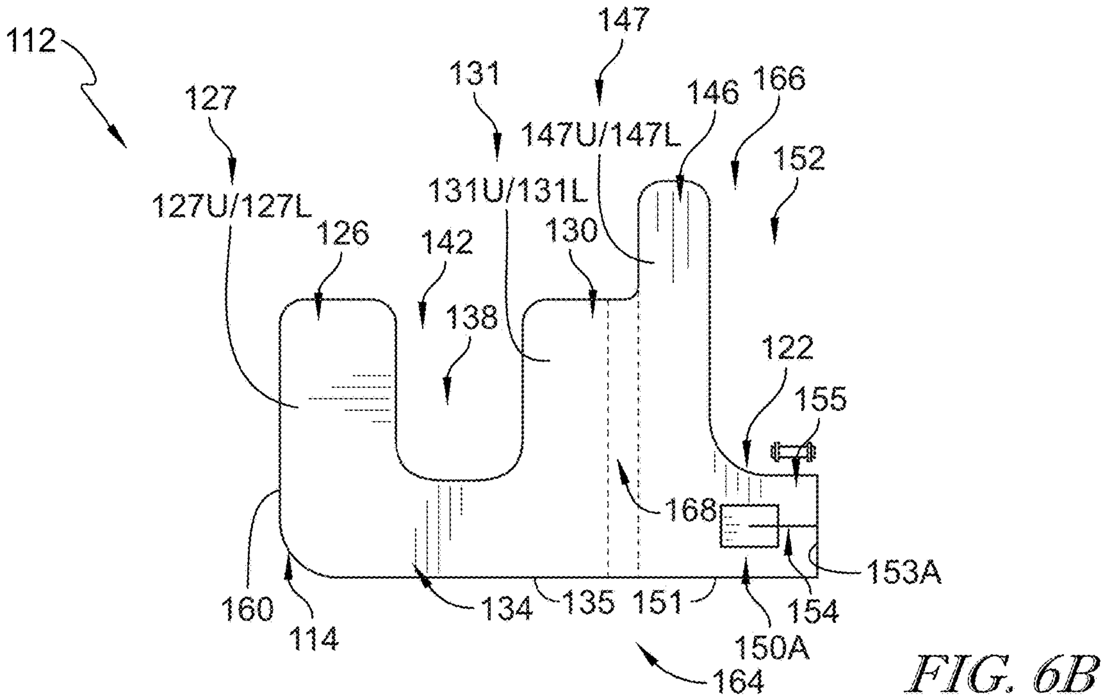
FIG. 6B is a top plan view of the mobility device of FIG. 6A in a collapsed position for storage and/or portage.

As shown in FIGS. 6A & 6B, another embodiment of a mobility device 120 is shown. The disclosure of mobility device 12 applies equally to mobility device 120 except in instances of conflict with the specific disclosure of mobility device 120, and similar numbering has been indicated between similar aspects for ease of understanding. The rigid mobility device 120 illustratively includes a first caregiver support platform 114 and a second caregiver support platform 116 for resting on the shoulders of first and second caregivers (not shown). The second caregiver support platform 116 is longitudinally spaced apart from the first caregiver support platform 114. The rigid mobility device 120 also illustratively includes a patient support platform 122 for supporting a patient (not shown). The patient support platform 122 is positioned between the first caregiver support platform 114 and the second caregiver support platform 116.

Referring to FIGS. 6A and 6B, the patient support platform 122 includes at least one connector 150. The at least one connector 150 illustratively includes a first connector 150A coupled to the first caregiver support platform 114 and extending longitudinally towards the second caregiver support platform 116. The at least one connector 150 also includes a second connector 150B coupled to the second caregiver support platform 16 and extending longitudinally towards the first caregiver support platform 114. Accordingly, the second connector 150B is engaged with the first connector 150A to form a hinged connection 154 so that the rigid mobility device 112 can be folded between an extended position for use and a collapsed position for storage and/or portage. The rigid mobility device 112 also includes a latch 155 which is coupled to and extends between the first connector 150A and the second connector 150B to lock the rigid mobility device 112 at the hinged connection 154 in the extended position for use. The latch 155 may be a sliding bolt, a lock, or any other suitable device to secure the rigid mobility device 112 in the extended position for use. In some embodiments, the latch 155 may also unlock the rigid mobility device 112 to allow configuration in the collapsed position for storage and/or portage.

Still referring to FIGS. 6A and 6B, the at least one connector 134 of the first caregiver support platform 114, the first curved transition 168, and the first connector 150A of the patient support platform 122 form a unitary longitudinal segment extending between the first end 160 and an outer end 153A of the first connector 150A, are integrally coupled together, and/or are formed as an integrally formed piece of material. In such embodiments, the second connector 150B of the patient support platform 122, the second curved transition 170, and the at least one connector 136 of the second caregiver support platform 116 form a unitary longitudinal segment extending between an outer end 153B of the second connector 150B and the second end 162, are integrally coupled together, and/or are formed as an integrally formed piece of material.

While certain illustrative embodiments have been described in detail in the figures and the foregoing description, such an illustration and description is to be considered as exemplary and not restrictive in character, it being understood that only illustrative embodiments have been shown and described and that all changes and modifications that come within the spirit of the disclosure are desired to be protected. There are a plurality of advantages of the present disclosure a rising from the various features of the methods, systems, and articles described herein. It will be noted that alternative embodiments of the methods, systems, and articles of the present disclosure may not include all of the features described yet still benefit from at least some of the advantages of such features. Those of ordinary skill in the art may readily devise their own implementations of the methods, systems, and articles that incorporate one or more of the features of the present disclosure.

The invention claimed is:

1. A rigid mobility device for supporting a person having an injury as a patient in an upright position relative to the ground, the device comprising:

a first caregiver support platform and a second caregiver support platform configured to rest on the shoulders of first and second caregivers, respectively, the second caregiver support platform being longitudinally spaced apart from the first caregiver support platform, each caregiver support platform including an outward shoulder support, an inward shoulder support longitudinally spaced apart from the outward shoulder support, and at least one connector arranged to extend between the outward shoulder support and the inward shoulder support, wherein a shoulder engagement surface of each outward shoulder support is vertically aligned with a shoulder engagement surface of the inward shoulder support of the corresponding caregiver support platform, and wherein the outward shoulder support, the inward shoulder support, and the at least one connector of each caregiver support platform cooperate to define a caregiver receiving space, and a patient support platform configured to support the arms of the patient and positioned between the first caregiver support platform and the second caregiver support platform, the patient support segment including a first arm support, a second arm support longitudinally spaced apart from the first arm support, and at least one connector arranged to extend between the first arm support and the second arm support, wherein a forearm support surface of the first arm support is vertically aligned with a forearm support surface of the second arm support, and wherein the first arm support, the second arm support, and the at least one connector cooperate to define a patient receiving space, wherein each caregiver support platform is configured to receive a caregiver within the caregiver receiving space such that the inward and outward shoulder supports of each caregiver support platform engage the caregiver's shoulders to support the patient with the caregiver's neck extending through the caregiver receiving space, wherein the patient support platform is configured to receive a patient within the patient receiving space such that the first arm support and the second arm support of the patient support platform each engage the patient's forearms to support the patient with the patient's torso extending through the patient receiving space, wherein each forearm support surface of the patient support platform is vertically offset relative to each shoulder engagement surface of the first and second caregiver support platforms such that the patient's arms are supported at a height offset from each caregiver's shoulders, and wherein the patient's arms are supported higher than each caregiver's shoulders.

2. A rigid mobility device for supporting a person having an injury as a patient in an upright position relative to the ground, the device comprising:

a first caregiver support platform and a second caregiver support platform configured to rest on the shoulders of first and second caregivers, respectively, the second caregiver support platform being longitudinally spaced apart from the first caregiver support platform, each caregiver support platform including an outward shoulder support, an inward shoulder support longitudinally spaced apart from the outward shoulder support, and at least one connector arranged to extend between the outward shoulder support and the inward shoulder support, wherein a shoulder engagement surface of each outward shoulder support is vertically aligned with a shoulder engagement surface of the inward shoulder support of the corresponding caregiver support platform, and wherein the outward shoulder support, the inward shoulder support, and the at least one connector of each caregiver support platform cooperate to define a caregiver receiving space, and a patient support platform configured to support the arms of the patient and positioned between the first caregiver support platform and the second caregiver support platform, the patient support segment including a first arm support, a second arm support longitudinally spaced apart from the first arm support, and at least one connector arranged to extend between the first arm support and the second arm support, wherein a forearm support surface of the first arm support is vertically aligned with a forearm support surface of the second arm support, and wherein the first arm support, the second arm support, and the at least one connector cooperate to define a patient receiving space, wherein each caregiver support platform is configured to receive a caregiver within the caregiver receiving space such that the inward and outward shoulder supports of each caregiver support platform engage the caregiver's shoulders to support the patient with the caregiver's neck extending through the caregiver receiving space, wherein the patient support platform is configured to receive a patient within the patient receiving space such that the first arm support and the second arm support of the patient support platform each engage the patient's forearms to support the patient with the patient's torso extending through the patient receiving space, wherein each forearm support surface of the patient support platform is vertically offset relative to each shoulder engagement surface of the first and second caregiver support platforms such that the patient's arms are supported at a height offset from each caregiver's shoulders, and wherein the rigid mobility device is vertically reversible, such that the vertical offset between the forearm support surfaces and each shoulder engagement surface can be selectively arranged to locate the forearm support surfaces above or below the shoulder engagement surfaces.

3. The rigid mobility device of claim 2, wherein each of the shoulder engagement surfaces and forearm engagement surfaces include reversible surfaces having opposing upper and lower portions.

4. A rigid mobility device for supporting a person having an injury as a patient in an upright position relative to the ground, the device comprising:

a first caregiver support platform and a second caregiver support platform configured to rest on the shoulders of first and second caregivers, respectively, the second caregiver support platform being longitudinally spaced apart from the first caregiver support platform, each caregiver support platform including an outward shoulder support, an inward shoulder support longitudinally spaced apart from the outward shoulder support, and at least one connector arranged to extend between the outward shoulder support and the inward shoulder support, wherein a shoulder engagement surface of each outward shoulder support is vertically aligned with a shoulder engagement surface of the inward shoulder support of the corresponding caregiver support platform, and wherein the outward shoulder support, the inward shoulder support, and the at least one connector of each caregiver support platform cooperate to define a caregiver receiving space, and a patient support platform configured to support the arms of the patient and positioned between the first caregiver support platform and the second caregiver support platform, the patient support segment including a first arm support, a second arm support longitudinally spaced apart from the first arm support, and at least one connector arranged to extend between the first arm support and the second arm support, wherein a forearm support surface of the first arm support is vertically aligned with a forearm support surface of the second arm support, and wherein the first arm support, the second arm support, and the at least one connector cooperate to define a patient receiving space, wherein each caregiver support platform is configured to receive a caregiver within the caregiver receiving space such that the inward and outward shoulder supports of each caregiver support platform engage the caregiver's shoulders to support the patient with the caregiver's neck extending through the caregiver receiving space, wherein the at least one connector of the patient support platform includes a first connector coupled to the first caregiver support platform and a second connector coupled to the second caregiver support platform, wherein the second connector is engaged with the first connector to form a hinged connection so that the device can be folded between an extended position for use and a collapsed position for storage/portage.

* * * * *